A. B. HERRICK.
RAIL BOND.
APPLICATION FILED APR. 19, 1905.
987,136.
Patented Mar. 21, 1911.
Fig. 1.
Fig. 2.
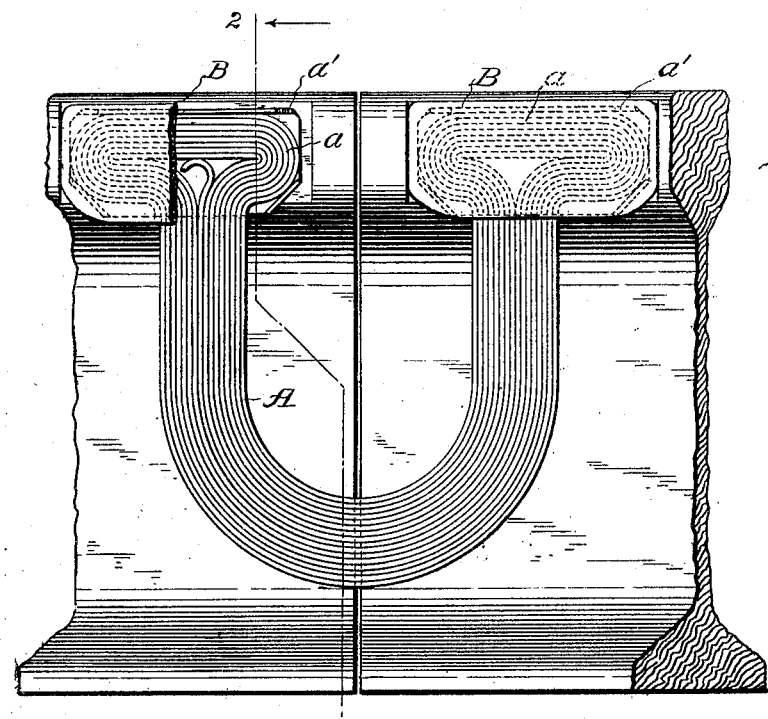
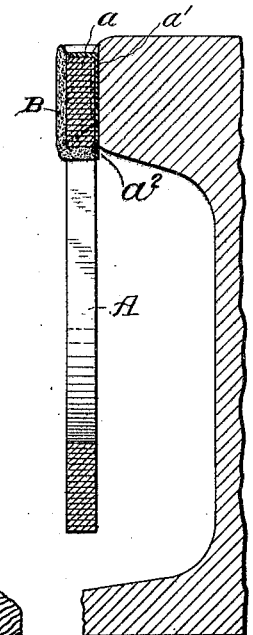
Fig. 4.
Fig. 3.
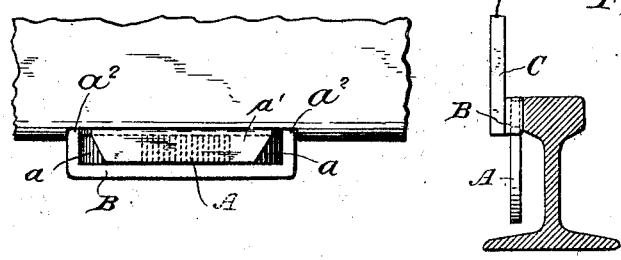
WITNESSES:
G. W. Saywell
Jno. F. Oberlin
INVENTOR:
Albert B. Herrick
by his attorney
J. B. Fay

UNITED STATES PATENT OFFICE.

ALBERT B. HERRICK, OF RIDGEWOOD, NEW JERSEY, ASSIGNOR TO THE ELECTRIC RAILWAY IMPROVEMENT COMPANY, OF CLEVELAND, OHIO, A CORPORATION OF OHIO.

RAIL-BOND.

987,136.

Specification of Letters Patent. Patented Mar. 21, 1911.

Application filed April 19, 1905. Serial No. 256,439.

*To all whom it may concern:*

Be it known that I, ALBERT B. HERRICK, a citizen of the United States, resident of Ridgewood, county of Bergen, and State of New Jersey, have invented a new and useful Improvement in Rail-Bonds, of which the following is a specification, the principle of the invention being herein explained and the best mode in which I have contemplated applying that principle, so as to distinguish it from other inventions.

My invention relates to rail-bonds for electrically connecting the adjacent ends of contiguous rails, its object being to effect such connections in an efficient and economical manner.

The bond embodying my invention is particularly adapted for use in a process for bonding rails in which the bond is secured to the rail by brazing, soldering or welding, wherein an electrical current is used for providing the necessary heat.

The said invention consists of means hereinafter fully described and particularly set forth in the claims.

The annexed drawing and the following description set forth in detail certain means embodying the invention, such disclosed means constituting, however, but one of various mechanical forms in which the principle of the invention may be used.

In said annexed drawing:—Figure 1 represents a side elevation of the adjacent ends of two abutting rails showing a rail-bond embodying my invention in contact therewith, a portion of one of the terminals of such bond being broken away to more clearly disclose its relationship with the main body of the bend; Fig. 2 represents a vertical cross-section taken upon the planes indicated by the lines 2—2 in Fig. 1; Fig. 3 represents an end elevation, upon a reduced scale, of a bond embodying my invention, together with a cross-section of a rail, and an electrode, the figure representing diagrammatically the bond, terminal and rail when in position ready for the passage of current through the bond and rail for effecting their attachment; and Fig. 4 represents a plan of one of the bond terminals in contact with the side of the rail.

The bond embodying my invention consists primarily of a body or main portion A formed at its extremities with the terminals *a a* which are the portions designed to be attached directly to the rail or other object being bonded. In the form of bond shown, such body is of laminated structure and the inside portion of each of the terminals is provided with a plate or sheet $a'$ of cementing material, such as braze or solder suitably attached to the main body portion. While the presence of this cementing material is preferable, it is not absolutely indispensable since the bonding may be effected without it. Upon the side, then, of the terminal opposite that directly in contact with the rails I secure a plate B made up of material having a high electrical resistance and a high fusing point compared with the solder, braze, or other cementing material designed for use with the bond in case such material is employed. The material thus utilized for the plate is preferably carbon, inasmuch as it combines both qualities, namely, that of high electrical resistance and high fusing point. Such carbon, being first prepared in suitable plastic form, may be readily molded to the terminals, and is then allowed to dry or bake thereon before applying the bond to the rails. In so applying such material to the bond terminals, it is furthermore caused to overlap the terminal upon the bottom and sides as shown, so as to form a mold or matrix for the terminal, but leaving the inner face free. The edges of such inner or contact face of the bond it will accordingly be seen are partially surrounded by the material in question, whereby there is formed a rib or bead projecting beyond the contact face and adapted to retain molten metal between said two faces. From the foregoing it will be seen that the carbon or other high resistance material when thus applied, forms a part of the complete bond. The top of the terminal is preferably left free so that, if necessary, other substances which might in special cases be required, may be added to the cementing material or to the copper of the terminals when the latter is fused or heated.

The process of applying the above-described bond to the rail is similar to that described in my application filed November 25, 1904, Serial No. 234,161, the specific modification of such general process being set up in another co-pending application filed June 4, 1909, Serial No. 500,130. Briefly described, the operation involves placing the bond in position against the sides of the abutting rail ends with the mold of carbon or other material on the outside, such rail sides having first been provided with a cleaned or abraded surface. An electrode C is then brought into contact therewith as shown in Fig. 3. Suitable clamping means (not shown) are provided for holding the bond and electrode in position and for completing the electrical circuit, as will be readily understood by those skilled in the art. Current of proper character now being passed through the circuit, the high electrical resistance of the substance B generates heat therein in sufficient degree to melt the copper of the bond, the cementing material (if used) and to heat that part of the rail in contact therewith, and thereby effect a substantial and permanent union between the copper of the bond and the rail.

By means of a bond of the above-described character it is seen that the carbon acts as a mold during the bonding operation as well as an electrode, so that when the operation is completed and the carbon removed the bond terminals have a finished appearance.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. As a new article of manufacture, a rail-bond provided with a medium of high electrical resistance in contact with a portion of its surface opposite to the contact surface thereof.

2. As a new article of manufacture, a rail-bond provided with a plate of carbon attached to the portion of its surface opposite to the contact surface thereof.

3. As a new article of manufacture, a rail-bond provided with a mold formed of a high resistance medium inclosing the portion of said bond adjacent to the face thereof designed to be attached directly to the rail.

4. As a new article of manufacture, a rail-bond provided with a mold formed of carbon inclosing the portion of said bond adjacent to the face thereof designed to be attached directly to the rail.

5. As a new article of manufacture, a rail bond having its terminal portions provided with a high resistance medium adapted to form a mold for such terminals.

6. As a new article of manufacture, a rail-bond having its terminal portions partially inclosed by carbon adapted to form molds for such terminal portions when the latter are applied to the rails.

7. As a new article of manufacture, a rail-bond provided with a medium of high electrical resistance in contact with the portion of its surface opposite to the contact face thereof, such medium projecting beyond such contact face so as to be adapted to retain molten metal between the contacting faces of the bond and object being bonded.

8. As a new article of manufacture, a rail-bond provided with a plate of carbon attached to the portion of its surface opposite the contact face thereof, said plate partially surrounding the edges of the bond terminal and projecting beyond such contact face so as to be adapted to retain molten metal between the contacting faces of the bond and object being bonded.

9. The combination with a rail-bond, of a mold formed of a high resistance medium and adapted to inclose the portion of said bond adjacent to the face thereof designed to be attached directly to the rail.

10. The combination with a rail-bond, of a mold formed of carbon and adapted to inclose the portion of said bond adjacent to the face thereof designed to be attached directly to the rail.

11. The combination with a rail-bond, of a member composed of a high resistance medium and adapted to form a mold for the terminal of said bond.

12. The combination with a rail-bond, of a member composed of a high resistance medium and adapted to contact with the portion of the surface of said bond opposite its contact face, said member projecting beyond such contact face so as to be adapted to retain molten metal between the contacting faces of the bond and object being bonded.

13. The combination with a rail-bond, of a member composed of carbon and adapted to contact with the portion of the surface of said bond opposite its contact face, said member partially surrounding the edges of the bond terminal and projecting beyond such contact face so as to retain molten metal between the contacting faces of the bond and object being bonded.

Signed by me, this 10th day of April 1905.

ALBERT B. HERRICK.

Attested by:
  Jno. F. Oberlin,
  A. E. Merkel.

---

Copies of this patent may be obtained for five cents each, by addressing the "Commissioner of Patents, Washington, D. C."